(12) United States Patent
Buryak

(10) Patent No.: US 7,200,301 B2
(45) Date of Patent: Apr. 3, 2007

(54) MULTI-CHANNEL GRATING DESIGN TECHNIQUE

(75) Inventor: Alexander Buryak, Killara (AU)

(73) Assignee: Redfern Optical Components Pty. Ltd., Eveleigh (AU)

(*) Notice: Subject to any disclaimer, the term of this patent is extended or adjusted under 35 U.S.C. 154(b) by 0 days.

(21) Appl. No.: 10/523,425

(22) PCT Filed: Jul. 30, 2003

(86) PCT No.: PCT/AU03/00959

§ 371 (c)(1),
(2), (4) Date: Dec. 5, 2005

(87) PCT Pub. No.: WO2004/011980

PCT Pub. Date: Feb. 5, 2004

(65) Prior Publication Data

US 2006/0104569 A1    May 18, 2006

(30) Foreign Application Priority Data

Jul. 30, 2002    (AU) .............................. 2002950462

(51) Int. Cl.
G02B 6/34    (2006.01)
G02B 6/10    (2006.01)
(52) U.S. Cl. .................... 385/37; 385/42; 385/131
(58) Field of Classification Search ............... 385/31, 385/33, 37, 38, 41, 16, 24; 359/130, 900
See application file for complete search history.

(56) References Cited

U.S. PATENT DOCUMENTS 5,942,956 A * 8/1999 Haq et al. ............... 333/21 R 6,317,539 B1    11/2001 Loh et al.

(Continued)

FOREIGN PATENT DOCUMENTS

WO    WO-9624079    8/1996

(Continued)

OTHER PUBLICATIONS

Buryak, Alexander V., et al., "Novel multi-channel grating designs", *Proceedings of Bragg Gratings, Photosensitivity and Poling in Glass Waveguides*, vol. 60 of Top Series, OSA, Washington, D.C., Paper BTHB3, (2001), 1-3.

(Continued)

*Primary Examiner*—Sung Pak
*Assistant Examiner*—Tina M. Wong
(74) *Attorney, Agent, or Firm*—Schwegman, Lundberg, Woessner & Kluth, P.A.

(57) ABSTRACT

A method of improving a grating design function describing a refractive index variation defining a multi-channel grating structure in a waveguide material, the improvement being a reduced maximum refractive index variation in the waveguide material along the grating structure while maintaining a desired functional spectral domain in a spectral response function associated with the design function, the method comprising the steps of modifying a first design function to generate a second design function having a reduced maximum amplitude compared with the first design function, determining a second response function associated with the second design function, modifying the second response function to create a third response function having a desired functional spectral domain, and determining a third design function associated with the third response function, and iterating the method steps until the desired improvement is achieved, wherein the third design function of the previous iteration takes the place of the first, design function of the next.

15 Claims, 7 Drawing Sheets

U.S. PATENT DOCUMENTS

| | | |
|---|---|---|
| 6,345,135 B1 | 2/2002 | Reid et al. |
| 6,445,852 B1* | 9/2002 | Feced et al. ................... 385/37 |
| 6,707,967 B2* | 3/2004 | Rothenberg et al. .......... 385/37 |
| 6,823,111 B2* | 11/2004 | Jette et al. .................... 385/37 |
| 2004/0146244 A1* | 7/2004 | Stepanov et al. ............. 385/37 |

FOREIGN PATENT DOCUMENTS

| | | |
|---|---|---|
| WO | WO-9922255 | 5/1999 |
| WO | WO-02069006 | 9/2002 |
| WO | WO-02075408 | 9/2002 |
| WO | WO-2004011980 | 2/2004 |

OTHER PUBLICATIONS

Buryak, Alexander V., et al., "Optimization of refractive index sampling for multichannel fiber Bragg gratings", *IEEE Journal of Quantum Electronics*, 39(1), (Jan. 2003), 91-98.

Deshmukh, Rajeev, International Search Report, pp. 1-3 for International Application No. PCT/AU2003/000959.

* cited by examiner

MULTI-CHANNEL GRATING DESIGN TECHNIQUE

CLAIM OF PRIORITY

This application is a U.S. National Stage Filing under 35 U.S.C. 371 from International Application No. PCT/AU2003/000959 filed Jul. 30, 2003, and published in English as WO 2004/011980 A1 on Feb. 5, 2004, which claims the benefit under Australian Patent Application No. 2002950462 filed Jul. 30, 2002 under 35 U.S.C. 119(e), which applications and publication are incorporated herein by reference.

FIELD OF THE INVENTION

The present invention relates broadly to a method of improving a grating design function describing a refractive index variation defining a multi-channel grating structure in a waveguide material, to a method of fabricating a multi-channel grating structure, and to a multi-channel grating structure.

BACKGROUND OF THE INVENTION

Multi-channel grating structures are typically written into photosensitive waveguides. The grating structure comprises a refractive index profile induced in the photosensitive waveguide, which in turn determines the optical characteristics such as the reflection, transmission, and group delay characteristics of the resulting grating structure.

The amplitude and phase of the refractive index profile can be described by a grating design function, which in turn is used in the control of an apparatus for writing the grating structure into the photosensitive waveguide. Typically, the writing apparatus comprises an optical interferometer.

It is known that a maximum refractive index contrast required to write multi-channel gratings increases with increasing number N of channels. Since photosensitive materials, such as a photosensitive fibre used to fabricate a Bragg grating, have material limits of the maximum achievable photo-induced refractive index change $\Delta n$, this represents a limitation on the maximum number of channels N that can be recorded in a given material. Thus, it is highly desirable to reduce a required $\Delta n_N$ as much as possible.

At least preferred embodiments of the present invention seek to provide a method of improving a grating design function in terms of a reduced maximum refractive index variation required in the waveguide material along the grating structure, without compromising the quality of spectral characteristics.

SUMMARY OF THE INVENTION

In accordance with a first aspect of the present invention there is provided a method of improving a grating design function describing a refractive index variation defining a multi-channel grating structure in a waveguide material, the improvement being a reduced maximum refractive index variation in the waveguide material along the grating structure while maintaining a desired functional spectral domain in a spectral response function associated with the design function, the method comprising the steps of:

modifying a first design function to generate a second design function having a reduced maximum amplitude compared with the first design function, determining a second response function associated with the second design function, modifying the second response function to create a third response function having a desired functional spectral domain, and determining a third design function associated with the third response function, and iterating the method steps until the desired improvement is achieved, wherein the third design function of the previous iteration takes the place of the first design function of the next.

In one embodiment, the step of modifying the second response function comprises replacing the corresponding spectral domain of the second response function by the desired functional spectral domain.

The desired functional spectral domain may comprise a corresponding spectral domain of a first response function associated with the first design function.

The method may comprise the pre-iteration step of determining the first design function from a or the associated first response function.

Preferably, the determining of the response functions from the design functions comprises solving a direct scattering problem, and the determining of the design functions from the response functions comprises solving an inverse scattering problem.

In one embodiment, the step of modifying the second response function to create the third response function is conducted in a manner such that the third response function has a desired response characteristic in at least one spectral domain other than the functional spectral domain. The step of modifying the second response function may comprise replacing the corresponding at least one spectral domain with the desired response characteristic.

Preferably, the step of modifying the first design function comprises applying a normalisation process or an averaging process to the first design function.

In one embodiment, the normalising process comprises replacing an amplitude function $\kappa(z)$ of the design function by a product of the square root of a constant A and a corresponding single-channel seeding amplitude function $\kappa_s(z)$, while maintaining a phase function of the design function. The constant A may be defined by a normalisation condition. In one embodiment, A is defined by the normalisation condition $$A = \int_0^l \kappa^2 dz \bigg/ \int_0^l \kappa_s^2 dz,$$

where l is a length of the multi-channel grating structure.

In one embodiment, the averaging process comprises averaging over a sampling or quasi-sampling period of the design function.

In another embodiment, the normalising or averaging processes may be complimented or replaced by a nonlinear transform reshaping ("squeezing") operation, which reduces $\kappa_{max}(z)$ while keeping the parameter $$\int_0^l \kappa^2 dz$$

substantially unchanged.

In accordance with a second aspect of the present invention, there is provided a method of fabricating a multi-channel grating structure, the method comprising the step of improving a grating design function describing a refractive index variation defining the multi-channel grating structure in a waveguide material as defined in the first aspect.

In accordance with a third aspect of the present invention, there is provided a multi-channel grating structure fabricated utilising a method of fabrication as defined in the second aspect.

BRIEF DESCRIPTION OF THE DRAWINGS

Preferred forms of the present invention will now be described with reference to the accompanying drawings.

DETAILED DESCRIPTION OF THE EMBODIMENTS

The preferred embodiment described provides a method of improving a grating design function in terms of a reduced maximum refractive index variation required in a waveguide material along the grating structure.

FIGS. 1(a)–(d) show calculated spectral-characteristics and design of a 17-channel Bragg grating prior to iteration procedure. It will be appreciated by a person skilled in the art that the spectral-characteristics are of a superb quality with virtually no deviations from a desired spectral-characteristics, in the example shown in FIG. 1 a square-shaped transmission characteristic (compare FIG. 1b).

Figure 1:
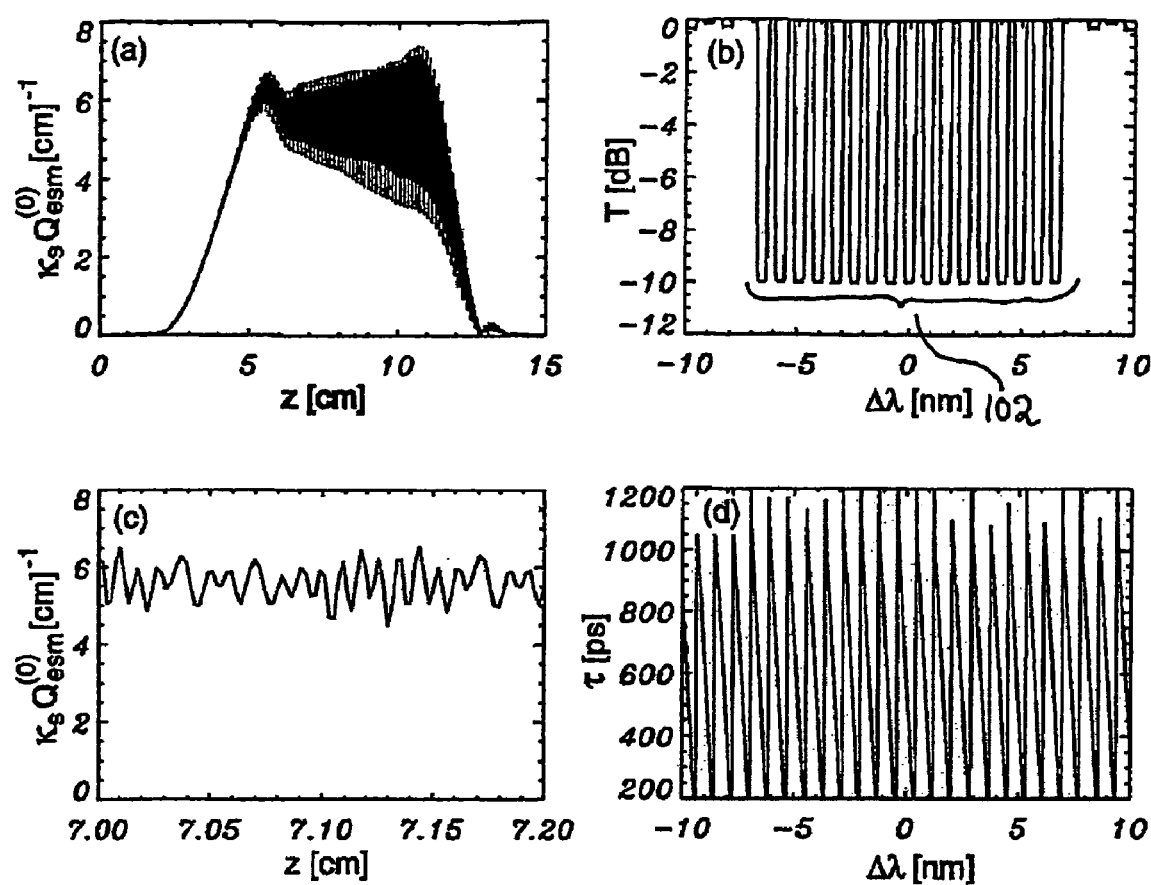
FIGS. 1(a)–(d) show the calculated first spectral characteristics and the first design amplitude of a multi-channel grating structure (the first design phase is not shown), illustrating one step of a method embodying the present invention.

It has been found by the inventors that the design of the 17-channel Bragg grating shown in FIG. 1 can be improved in terms of minimisation of a maximum refractive index change required in the photosensitive material e.g. a photosensitive optical fibre, into which the 17-channel Bragg grating is to be written. In other words, the fibre Bragg grating (FBG) amplitude versus distance z along the FBG (FIG. 1a), can be improved in terms of minimisation of the maximum amplitude without compromising the spectral response. In the example embodiment, this is achieved by subjecting the design to an iterative optimisation procedure which will now be described.

In the example embodiment, the maximum in the FBG amplitude versus distance z is initially reduced in the following way: Starting from the FBG amplitude versus distance z shown in FIG. 1(a), the amplitude function k(z) is replaced by $\sqrt{A}\kappa_s(z)$, where $\kappa_s(z)$ is the corresponding single channel (seeding) grating amplitude function and the constant A is defined by the normalization condition $$A = \int_0^l \kappa^2 dz \bigg/ \int_0^l \kappa_s^2 dz.$$

Alternatively k(z) is replaced by its averaged (smoothed) version. Alternatively, the normalising or averaging process may be complemented or replaced by any nonlinear transform reshaping ("squeezing") operation, which reduces $\kappa_{max}(z)$ while keeping the parameter $$\int_0^l \kappa^2 dz$$

unchanged. The unchanged multi-channel grating phase and the modified (the second) grating amplitude are then used as the input data for solving a direct scattering problem utilising a suitable direct scattering solver algorithm. Thus, a spectral response function corresponding to the modified grating design function is determined.

Figure 2:
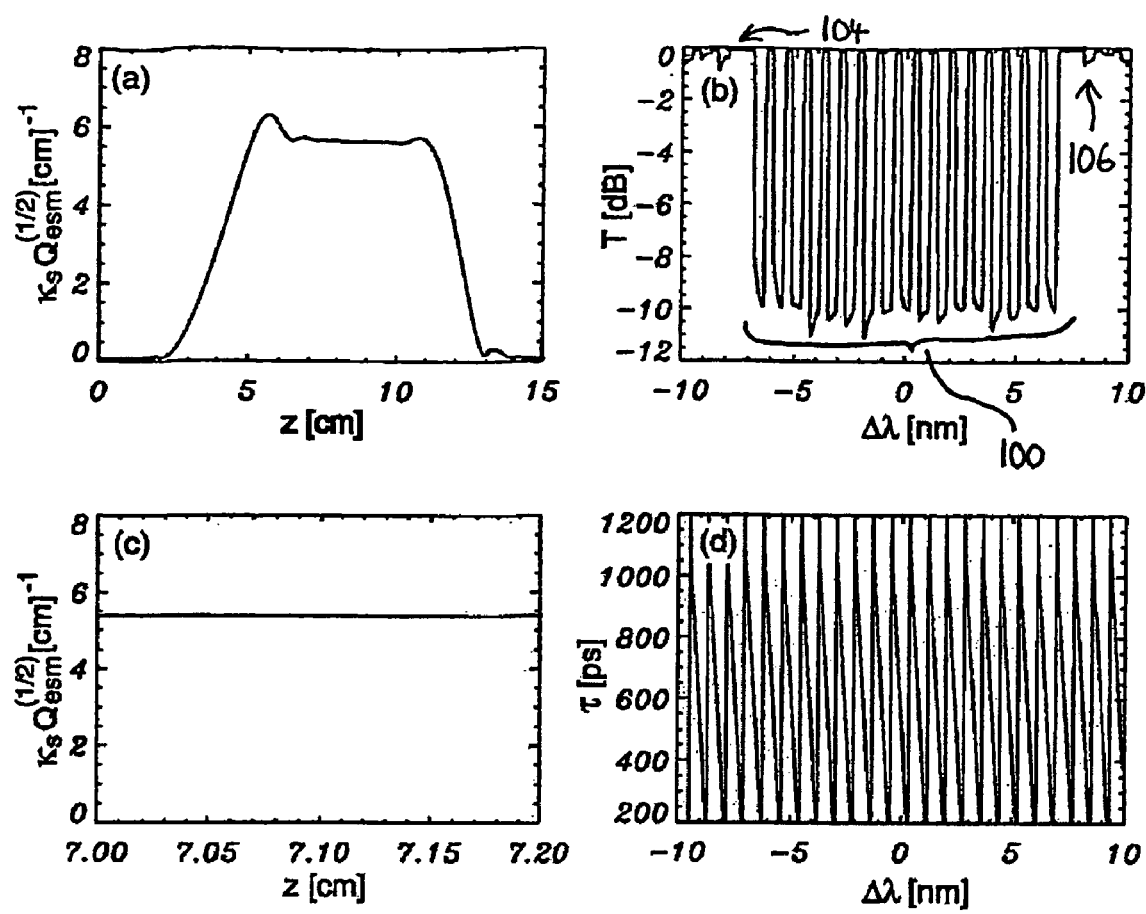
FIGS. 2(a)–(d) show the calculated second spectral characteristics and the second design results (normalised/averaged amplitude profile), illustrating one step of a method embodying the present invention.

The second grating design amplitude and the corresponding spectral response data are shown in FIGS. 2(a–d). Clearly the spectral characteristics in the central part 100 of the wavelength range in FIG. 2(b), which is the functional portion of the spectral domain in the example embodiment, are less than perfect (compare central part 102 in FIG. 1(b)). As a next step these characteristics are modified.

Figure 3:
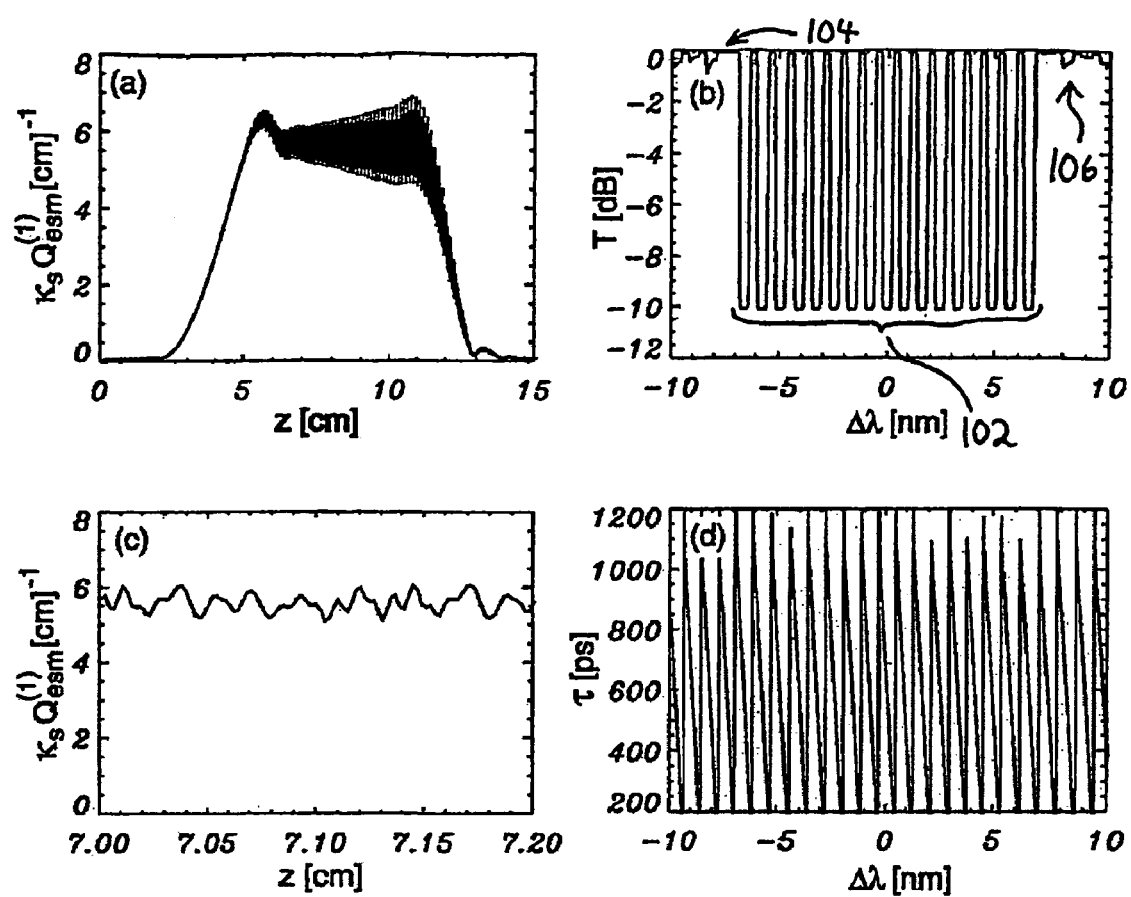
FIGS. 3(a)–(d) show the calculated third spectral characteristics and the third design results which correspond to the first completed iteration embodying the present invention.

Within the central channel spectral domain it is replaced by the initial (pre-iteration) data, compare central part 102 in FIGS. 1(b) and 3(b). Outside the central channel spectral domains the determined spectral response data is left intact, compare regions 104 and 106 in FIGS. 2(b) and 3(b), i.e. that spectral domain is allowed to evolve during the iteration process.

As a final step of each iteration, an inverse scattering problem is solved for the modified spectral response data to determine the associated, better optimised, multi-channelled grating design function, see FIGS. 3(a) and (c).

Figure 4:
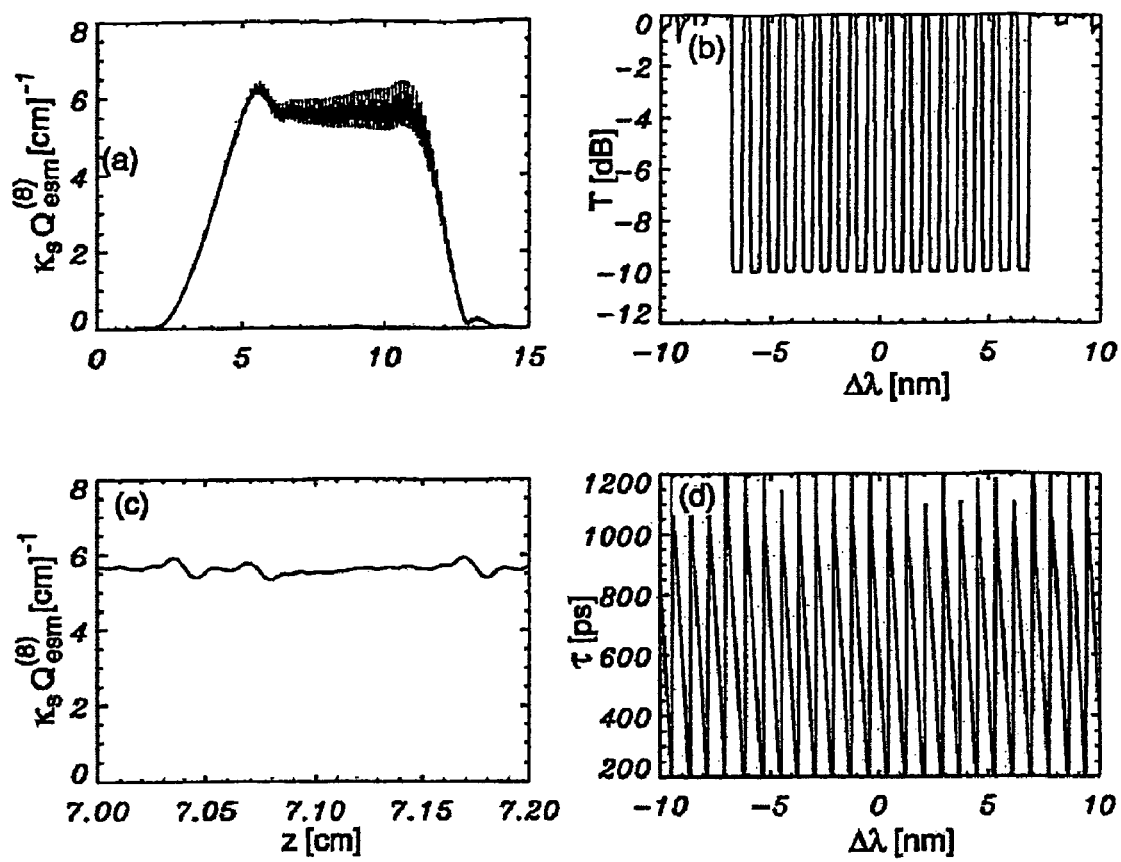
FIGS. 4(a)–(d) show calculated spectral characteristics and design results after 8 iterations of an improvement process embodying the present invention.
Figure 5:
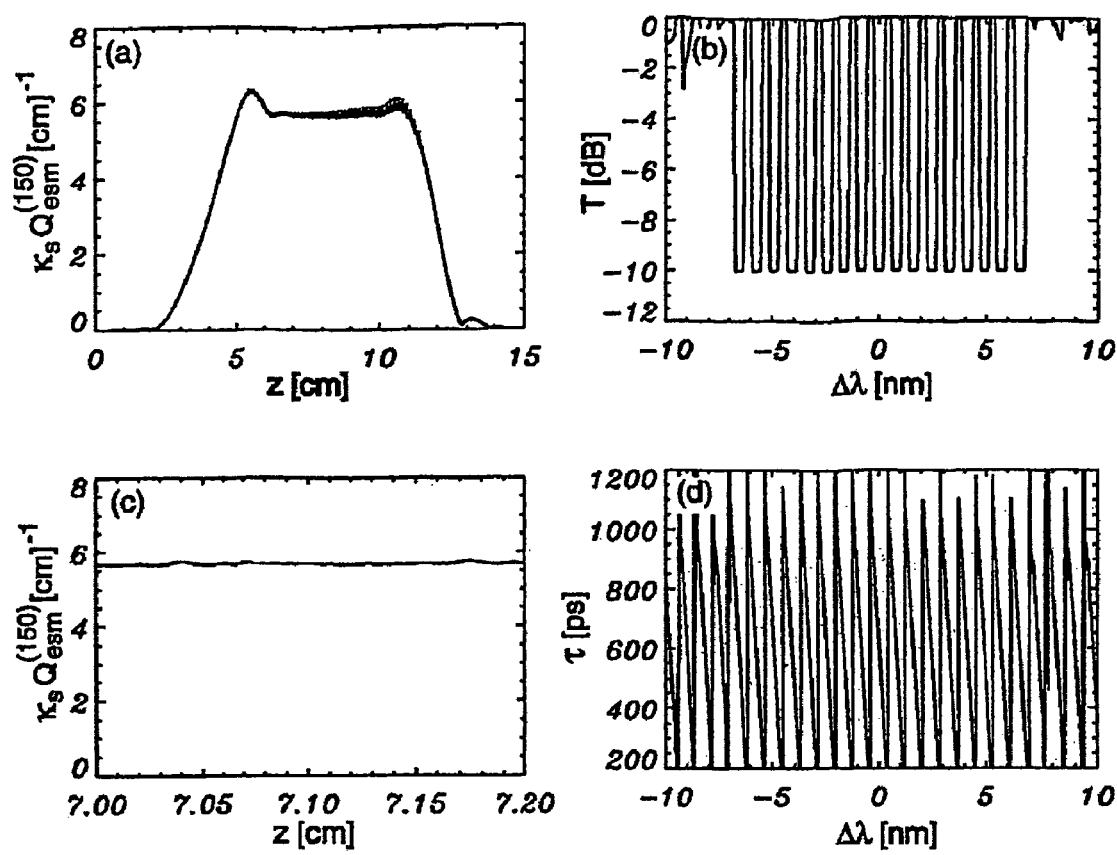
FIGS. 5(a)–(d) show calculated spectral characteristics and design results after 150 iterations of an improvement process embodying the present invention.

The above method steps are then iterated in the example embodiment, until a desired improvement is achieved. FIGS. 4 and 5 show the level of convergence after 8 and 150 iterations for the 17-channel grating design. For each of the FIGS. 4 and 5, (a to d) show calculated spectral characteristics and design of the 17-channel FBG. As can be seen from a comparison of FIG. 1(a) and FIG. 5(a) the optimisation process embodying the present invention has improved by about 13.5% to a lower value, while, due to the nature of the optimization process embodying the present invention, the superb spectral characteristics of the design are preserved (compare FIGS. 1(b), (d), and FIGS. 5(b), (d)).

It will be appreciated by a person skilled in the art that the step of modifying the second response function to create the third response function may further be conducted in a manner such that the modified response function has a desired response characteristic in at least one portion of the spectral domain other than the functional portion of the spectral domain, by e.g., replacing the corresponding at least one portion of the spectral domain in the second response function with the desired response characteristic. At the same time, it will be appreciated that parts of the spectral domain need to be allowed to evolve during the iteration process.

Figure 6:
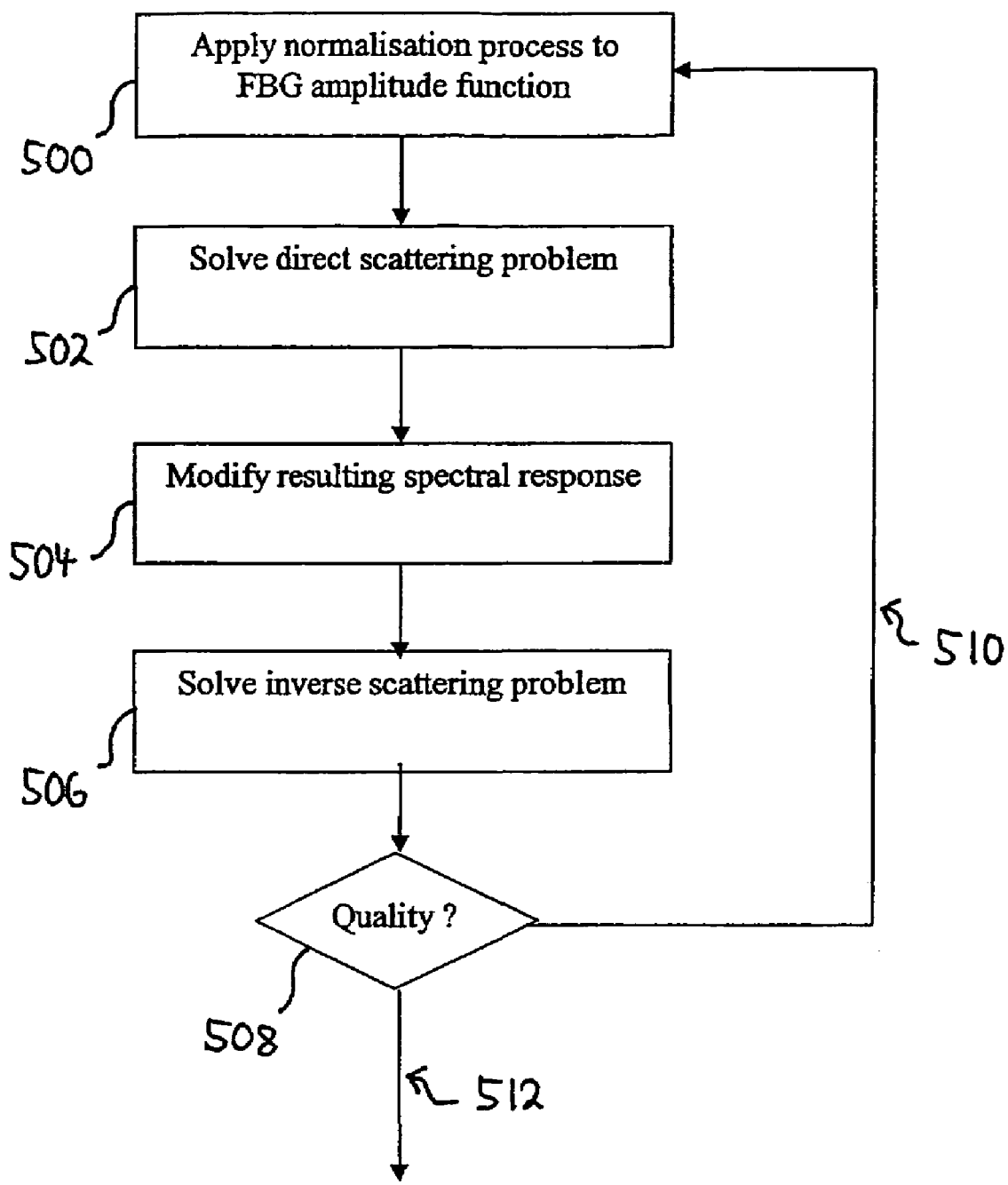
FIG. 6 is a flowchart illustrating a multi-channel grating design improvement process embodying the present invention.

FIG. 6 shows a flowchart illustrating the iterative process of the example embodiment, as follows:

Step 500, applying a normalisation or averaging process to a given FBG amplitude function, Step 502, solve a direct scattering problem based on the modified grating design function;

Step 504, modify the resulting spectral response;

Step 506, solve an inverse scattering problem based on the modified spectral response;

Step 508, determine whether a desired quality has been achieved, and repeat the steps (return loop 510) if not, or stop the iteration as indicated by arrow 512.

In the following, a description will be given of how to obtain a suitable initial (pre-iteration) grating design (compare FIG. 1), in example embodiments.

In the example embodiment, a multi-channel grating function is constructed by solving the standard inverse scattering problem for multi-channel wavelength-shifted spectral characteristics. Spectral response functions $H_R(\lambda)$ for partial single gratings are being de-phased with respect to each other. In other words, the inverse scattering problem may be presented as:

$$H_R^{total}(\lambda) = H_R(\lambda-\lambda_1)e^{i\theta_1} + H_R(\lambda-\lambda_2)e^{i\theta_2} + H_R(\lambda-\lambda_3)e^{i\theta_3} + \quad (1)$$

with nonzero relative phases $\theta_i$ in the example embodiment. It is to be noted that spectral responses are being de-phased, not partial seeding gratings themselves. After solving the inverse scattering problem for $H_R^{total}(\lambda)$, the multi-channel grating design function is obtained and may be presented in a form:

$$q(z) = \kappa_s Q e^{i(k_0 z + \theta + \psi)} \equiv \kappa e^{ik_0 z + \theta + \psi} \quad (2)$$

where we explicitly retain, for illustrative purposes, the single channel grating design function $\kappa_s e^{i(k_0 + \theta + \psi)}$. The remaining factors in the expression (2) represent a "sampling" function, which is a periodic. It is thus not a sampling, i.e. periodic, function anymore, but deviates from a sampling function.

It will be appreciated by a person skilled in the art that in order to initially (prior to our iterative scheme) pre-optimise the grating design for minimum refractive index change $\Delta n_N$ as a function of the number of channels N, suitable numerical or analytical methods can be applied.

For relatively small number of channels N one can numerically scan through possible combinations of relative phases $\theta_i$ (solving an inverse scattering problem for each particular combination of dephasing angles $\theta_i$) and selecting the combination which is optimal according to some specific selection criterion (e.g. selecting the combination which minimises maximum required refractive index change).

For N>>1 location of the optimal set $\theta_i$ is difficult. Even rough direct scanning through all possible sets of angles (followed by efficient numerical minimum search routines) quickly becomes numerically inefficient.

In the example embodiment, the approximate equivalence between partial spectra dephasing angles $\theta_i$ and partial grating relative phases $\phi_l$ is utilised. Indeed, for weak gratings the first order Born approximation holds:

$$-\frac{1}{2}q(z/2) = \int_{-\infty}^{+\infty} r(\beta)\exp(-i\beta z)d\beta, \quad (3)$$

where q(z) is a grating design function and r(β) is a complex reflection coefficient.

The Fourier transform (3) is a linear operation with a major property $F(\alpha_1 r^{(1)} + \alpha_2 r^{(2)}) = \alpha_1 F r^{(1)} + \alpha_2 F r^{(2)}$. Thus, in this approximation, dephasing of partial gratings is equivalent to dephasing of partial spectral channel responses. Formally the last statement does not hold beyond weak grating limit. However, in practice, it is still approximately correct and the optimal set of angles $\phi_i$ (for dephasing of partial gratings) may be used as a very good approximation for the optimal set of partial spectral channel angles $\theta_i$. The only important change related to the "sampling" function between dephasing of partial channels and dephasing of partial gratings approaches is that it becomes slightly a periodic, as mentioned above.

Therefore, the phase shift values $\theta_i$ may be taken from a partial gratings de-phasing grating design method In the example embodiment, a sampling function which periodically modulates the amplitude of a given single-channel grating (seeding grating) is utilised. In addition to the periodic modulation of the amplitude of the seeding grating, different relevant phases $\phi_l$ for each of the wavelength-seeding gratings are introduced Accordingly, the resulting design function in the example embodiment may be expressed as:

$$\sum_{l=1}^{N} \kappa_s e^{i[K_0 z + \theta + (2l-N-1)\Delta kz/2 + \phi_l]} = \kappa_s Q e^{i(K_0 z + \theta + \psi)} \quad (4)$$

where the additional phase of the grating $\psi = \psi(z)$ and the sampling amplitude $Q = Q(z)$ are given by:

$$Q^2(z) = 4\sum_{l,p=1}^{N/2} \cos(\alpha_l - \alpha_p)\cos(n_l\Delta kz/2 + \beta_l)\cos(n_p\Delta kz/2 + \beta_p), \text{ and}$$

$$\psi(z) = \tan^{-1}\left[\frac{\sum_{l=1}^{N/2} \sin\alpha_l \cos(n_l\Delta kz/2 + \beta_l)}{\sum_{l=1}^{N/2} \cos\alpha_l \cos(n_l\Delta kz/2 + \beta_l)}\right], \quad N \text{ is even}$$

or $$Q^2(z) = 4\sum_{l=1}^{(N-1)/2} \cos\alpha_l \cos(n_l\Delta kz/2 + \beta_l) +$$

$$4\sum_{l,p=1}^{(N-1)/2} \cos(\alpha_l - \alpha_p)\cos(n_l\Delta kz/2 + \beta_l)\cos(n_p\Delta kz/2 + \beta_p) + 1,$$

and $$\psi(z) = \tan^{-1}\left[\frac{\sum_{l=1}^{(N-1)/2} \sin\alpha_l \cos(n_l\Delta kz/2 + \beta_l)}{\sum_{l=1}^{(N-1)/2} \cos\alpha_l \cos(n_l\Delta kz/2 + \beta_l + 1)}\right], \quad N \text{ is odd,}$$

where $n_l \equiv 2l-N-1$ and $n_p \equiv 2p-N-1$.

In the above expressions for $Q(z)$ and $\psi(z)$ we use notations $\alpha_l \equiv (\phi_l + \phi_{N+1-l})/2$, $\beta_l \equiv (\phi_l - \phi_{N+1-l})/2$ and set $\phi_{(N+1)/2} = 0$ for odd number of channels.

In order to reduce the maximum value of Q along the grating structure, while trying to avoid touching the zero level along the grating structure, the minimization strategy used in the example embodiment is minimizing its maximum deviations of $Q(z)$ along z from the theoretical limit level of $\sqrt{N}$. Mathematically this may be formulated as finding $$Q_{dm}(z; \alpha_l^{(opt)}, \beta_l^{(opt)}) \text{ for which } \max_z \{Q_{dm}(z; \alpha_l^{(opt)}, \beta_l^{(opt)})\} -$$
$$\min_z \{Q_{dm}(z; \alpha_l^{(opt)}, \beta_l^{(opt)})\} =$$
$$\min_{(\alpha_l, \beta_l)} [\max_z \{Q(z; \alpha_l, \beta_l)\} - \min_z \{Q(z; \alpha_l, \beta_l)\}]$$

This approach is implemented in the example embodiment by using a simulated annealing algorithm—a Monte Carlo approach for minimizing of multi-variable functions.

The phase shift values $\phi_l$ ($\alpha_l^{(opt)}$, $\beta_l^{(opt)}$) thus determined are then utilised as phase shift values $\theta_i$ for the inverse scattering problem as part of the example embodiment (see equation (1)). The obtained dephased N-channel design may be used as an input for the iterative optimisation procedure embodying the present invention.

In the preferred embodiment, the strategy of difference minimisation is then extended further. The N central-channel-only minimisation set of dephasing angles $\phi_i$ (1<i<N) is taken and used to construct the initial sampling function $S(z)=Q(z) e^{i\psi(z)}$ on a period $2\pi/\Delta k$. Then the nontrivial $Q(z)$ dependence is replaced by the asymptotic value $N^{1/2}$ and the resulting intermediate sampling function (with only phase sampling present) is decomposed in a Fourier series to find new Fourier coefficients $a_l$ and a new set of the corresponding dephasing angles $\phi_l \equiv \text{Arg}(\alpha_l)$. This procedure leads to a change in partial high-amplitude grating coefficients. In addition, n extra small higher order harmonic terms (corresponding to additional small amplitude partial gratings) arise. Next we replace coefficients $\alpha_l$ for N high-amplitude partial gratings with $Ce^{i\psi_l^{(new)}}$, where a constant C is found from the normalisation condition $$\sum_{l=1}^{N} |a_l|^2 = NC^2 \qquad (4)$$

and all coefficients $\alpha_l$ outside the band $l \in [1-n/2, N+n/2]$ being set to zero. These modified N+n amplitudes are used to construct a new "sampling" function via inverse Fourier transformation.

The procedure is repeated until a selected quality criterion has been reached. In the example embodiment, the iteration is stopped when a variation in the maximum "sampling" function amplitude between iterations falls below $10^{-6}$.

The extended dephasing procedure for an infinite number of side channels n translates all nontrivial amplitude modulation of the sampling function into its phase $\psi(z)$. As a price for doing that, about 10N additional partial gratings (higher order harmonics with $|\alpha_l|>0.001$) appear in the spectral characteristics, which means that phase dependence $\psi(z)$ has a very fine structure. However, for practical applications the scale of the fine structure should always be larger than the size of the laser beam used for grating writing. An estimate for the upper limit for the maximum number N+n of nonzero partial gratings can be given as $$N + n = \frac{\lambda_0^2}{2z_0 \Delta \lambda_0 n_0}, \qquad (5)$$

where $\lambda_0$ is the central wavelength [in microns], $z_0$ is the minimal laser beam size [in microns], $\Delta\lambda$ is the neighbouring channel spacing [in nanometres], and $n_0$ is the FBG average refractive index. Estimate (5) is essentially based on the Nyquist theorem requiring at least two sampling points to define the cosine wave cycle. For the purpose of this description, the upper limit for the maximum number N+n given by the resolution limitation in the fabrication of the grating [estimate (5)] will be referred to as un-limited in the context of the preferred embodiment of the present invention, as it relates to a given experimental limitation.

In the example embodiment, the number of additional small amplitude partial gratings has been (further) limited. It was found that selecting n=2N+2 channels gives good results in preferred embodiments of the invention.

Accordingly, in the example embodiment the initial (pre-iteration) grating design function (compare FIG. 1) is arrived at through a multi-channel grating design approach based on partial single grating dephasing, which may be further modified by an extended grating dephasing procedure allowing for a limited number of side channels in the spectral characteristics. The set of angles and amplitudes obtained by the grating dephasing procedure is used for spectral dephasing of partial channels to obtain a pre-iteration design. After this pre-iteration design is obtained, the iterative procedure embodying the present invention is applied.

The implementation of the multi-channel grating design of the preferred embodiment in a grating structure requires grating writing apparatus with high spatial resolution to be utilised. Therefore, in a grating writing apparatus relying on photo induced refractive index changes, the apparatus preferably comprises a beam focusing means to reduce the size of the beam in the core of the photosensitive waveguide.

Figure 7:
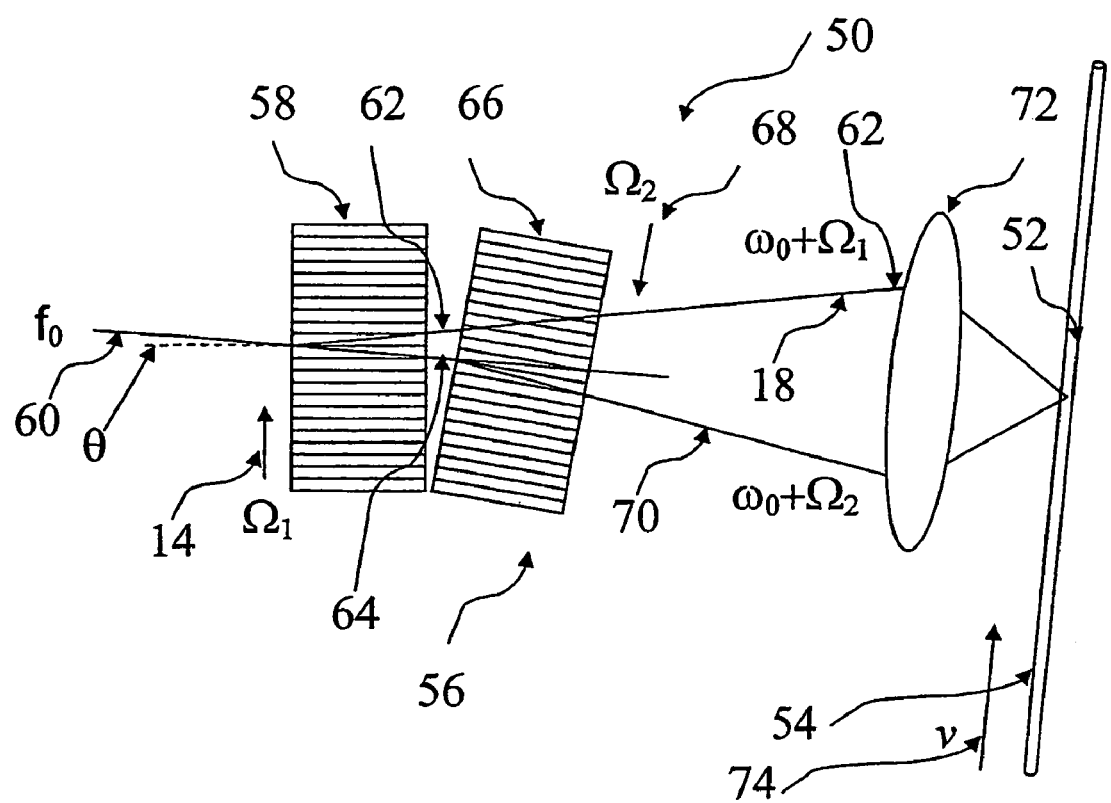
FIG. 7 shows an experimental set-up for writing a multi-channel grating structure of a multi-channel grating design embodying the present invention.

FIG. 7 shows an example experimental set up 50 for writing a multichannel grating 52 into an optical fibre 54. The experimental set up 50 comprises an interferometer 56 which includes a first acousto-optic modulation 58 being operated under an acousto-optic wave of a first frequency $\Omega_1$, as indicated by arrow 14. An incoming light beam 60 is incident on the first acousto-optic modulator 58 under a first order Bragg angle. The operating conditions of the acousto-optic modulator 58 are chosen such that the modulator 58 is under driven, whereby approximately 50% of the incoming beam 60 is diffracted into a first order beam 62, and 50% passing through the acousto-optic modulator 58 as un-diffracted beam 64. The undiffracted beam 64 is incident on a second acousto-optic modulator 66 of the interferometer 56 under a first order Bragg angle, whereas the beam 62 is not. Accordingly, the beam 62 passing through the second acousto-optic modulator 66 without any significant loss.

The second acousto-optic modulator 66 is operated under an acousto-optic wave of a frequency $\Omega_2$, which propagates in a direction opposed the direction of the acousto-optic wave in the first modulator 58 as indicated by arrow 68. After the second acousto-optic modulator 66 the first order diffracted beam 70 and the beam 62 are frequency shifted in the same direction (e.g. higher frequency), but by different amounts i.e. $\Omega_1$ v $\Omega_2$.

The beams 62, 70 are then brought to interference utilising an optical lens 72, and the resulting interference pattern (at numeral 74) induces refractive index changes in the photosensitive optical fibre 54, whereby a refractive index profile, i.e. grating structure 52, is created in the optical fibre 54.

In FIG. 7, the optical fibre 54 is translated along the interferometer at a speed v, as indicated by arrow 74.

It will be appreciated by a person skilled in the art that the experimental set up 50 shown in FIG. 7 can be utilised to write a multi-channel grating structure of a multi-channel grating design embodying the present invention through suitable control of the first and second acousto-optic modulators 58, 66, in conjunction with a suitable control of the speed v at which the optical fibre 54 is translated along the interferometer 56 at any particular time. The high spatial resolution required to implement the multi-channel design of the preferred embodiment is achieved in the set up shown in FIG. 7 by utilising optical lens 72, with the practical limit of the beam size in the focal plane preferably being of the order of the waveguide core size.

It will be appreciated by a person skilled in the art that numerous variations and/or modifications may be made to the present invention as shown in the specific embodiments without departing from the spirit of scope of the invention as broadly described. The present embodiments are, therefore, to be considered in all respects to be illustrative and not restrictive.

For example, it will be appreciated that the initial grating design function utilised as the starting point of an improvement method embodying the present invention may be derived utilising different methods as the ones described for the example embodiment. Alternative methods can be found e.g. in Patent Co-operation Treaty (PCI) patent application no. PCT/AU02/00160 filed on 15 Feb. 2002, entitled "Multi-channel grating design" assigned to the present applicant, PCT application no. PCT/AU02/00309 filed on 15 Mar. 2002, entitled "Grating design" assigned to the present applicant, and/or Austrian provisional patent application no. PS1131 filed on 15 Mar. 2002, entitled "Improved multi-channel grating design" in the name of the present applicant.

Furthermore, it will be appreciated that the present invention is not limited to the type of multi-channel gratings of the example embodiments described. For example, the present invention can be equally applied to multi-channel gratings consisting of non-identical spectral channels, and/or gratings consisting of groups of spectral channels.

Furthermore, it will be appreciated that other numerical or mathematical approaches can be taken to implement the iterative procedure embodying the present invention, e.g. comprises solving complex integral equations.

Furthermore, multi-channel gratings can be created on the basis of the multi-channel grating design of the present invention using various known grating creation techniques, including one or more of the group of photo-induced refractive index variation in photo sensitive waveguide materials, etching techniques including etching techniques utilising a phasemask, and epitaxial techniques.

Also, it will be appreciated that methods embodying the present invention may be complimented by known optimisation techniques such as generic optimisation algorithms.

In the claims that follow and in the summary of the invention, except where the context requires otherwise due to express language or necessary implication the word "comprising" is used in the sense of "including", i.e. the features specified may be associated with further features in various embodiments of the invention.

The invention claimed is:

1. A method of iteratively optimising a design function for a grating structure, the method comprising:
 (a) obtaining a first design function describing a refractive index variation defining a multi-channel grating structure in a waveguide material;
 (b) generating a second design function from the first design function, the second design function having a reduced maximum amplitude compared with the first design function;
 (c) determining a second response function associated with the second design function, the second response function describing a spectral response of the grating structure defined by the second grating function;
 (d) replacing selected parts of the second response function to create a third response function having predetermined spectral characteristics in a functional portion of the spectral domain;
 (e) determining a third design function associated with the third response function; and
 (f) repeating steps (b) to (e), wherein the third design function of the previous iteration is taken as the first design function of the current iteration, and wherein the iterative repetition continues until predetermined quality criteria are satisfied, the quality criteria comprising a reduction of a maximum refractive index variation in the waveguide material along the waveguide structure and the preservation of the predetermined spectral characteristics in the functional portion of the spectral domain.

2. A method as claimed in claim 1, wherein the step of replacing selected parts of the second response function comprises replacing the selected parts of the second response function by a predefined spectral response.

3. A method as claimed in claim 2, wherein the predefined spectral response comprises a portion of a first response function describing a spectral response of the grating structure defined by the first design function.

4. A method as claimed in claim 1, wherein the step of obtaining the first design function comprises determining the first design function from a first response function describing a spectral response.

5. A method as claimed in claim 1, wherein the determining of the response functions from the design functions comprises solving a direct scattering problem, and the determining of the design functions from the response functions comprises solving an inverse scattering problem.

6. A method as claimed in claim 1, wherein the step of replacing selected parts of the second response function to create the third response function is conducted in a maimer such that the third response function has a desired response charackristic in at least one portion of the spectral domain other than the functional portion of the spectral domain.

7. A method as claimed in claim 6, wherein the step of replacing selected parts of the second response function comprises replacing the corresponding at least one portion of the spectral domain with a predetermined response characteristic.

8. A method as claimed in claim 1, wherein the step of generating a second design function from the first design function comprises applying at least one of a normalisation process or an averaging process to the first design function.

9. A method as claimed in claim 8, wherein the normalisation process comprises replacing an amplitude function $\kappa(z)$ of the design function by a product of the square root of a constant A and a corresponding single-channel seeding amplitude function $\kappa_s(i)$, while maintaining a phase function of the design function.

10. A method as claimed in claim 9, wherein the constant A is defined by a normalisation condition.

11. A method as claimed in claim 10, wherein A is defined by the normalisation condition $$A = \int_0^l \kappa^2 \, dz \bigg/ \int_0^l \kappa_s^2 \, dz,$$

where l is a length of the multi-channel grating structure.

12. A method as claimed in claim 8, wherein the averaging process comprises averaging over a sampling or quasi-sampling period of the design function.

13. A method as claimed in claim 8, wherein the normalising or averaging process is complemented or replaced by a nonlinear transform reshaping operation, which reduces $\kappa_{max}(z)$ while keeping the parameter $$\int_0^l \kappa^2 \, dz$$

substantially unchanged.

14. A method of fabricating a multi-channel grating structure, the method comprising iteratively optimising a grating design function describing a refractive index variation defining the multi-channel grating structure in a waveguide material as claimed in claim 1.

15. A multi-channel grating structure fabricated utilising a method of fabrication as claimed in claim 14.

* * * * *

UNITED STATES PATENT AND TRADEMARK OFFICE
CERTIFICATE OF CORRECTION

| | |
|---|---|
| PATENT NO. | : 7,200,301 B2 |
| APPLICATION NO. | : 10/523425 |
| DATED | : April 3, 2007 |
| INVENTOR(S) | : Buryak |

It is certified that error appears in the above-identified patent and that said Letters Patent is hereby corrected as shown below:

Column 2, lines 7-10, after "function," delete "and iterating the method ---------------------function of the next." and insert the same on Col. 2, Line 8, as a new sub paragraph.

Column 3, line 59, after "material" insert -- , --.

Column 5, line 10, after "function" delete "," and insert -- ; --, therefor.

Column 6, line 23, after "method" insert -- . --.

Column 6, line 29, after "introduced" insert -- . --.

Column 7, line 36, delete "a," and insert -- $\alpha_i$ --, therefor.

Column 8, line 44, delete "multichannel" and insert -- multi-channel --, therefor.

Column 8, line 55, delete "undiffacted" and insert -- un-diffracted --, therefor.

Column 9, line 34, delete "(PCI)" and insert -- (PCT) --, therefor.

Column 9, line 39, delete "Austrian" and insert -- Australian --, therefor.

Column 10, line 52, in Claim 6, delete "maimer" and insert -- manner --, therefor.

Column 10, line 54, in Claim 6, delete "charackristic" and insert -- characteristic --, therefor.

UNITED STATES PATENT AND TRADEMARK OFFICE
CERTIFICATE OF CORRECTION

PATENT NO. : 7,200,301 B2
APPLICATION NO. : 10/523425
DATED : April 3, 2007
INVENTOR(S) : Buryak It is certified that error appears in the above-identified patent and that said Letters Patent is hereby corrected as shown below:

Column 11, line 2, in Claim 9, delete "$\kappa_s(i)$" and insert -- $\kappa_s(z)$ --, therefor.

Signed and Sealed this

Twenty-fifth Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 7,200,301 B2
APPLICATION NO. : 10/523425
DATED : April 3, 2007
INVENTOR(S) : Buryak It is certified that error appears in the above-identified patent and that said Letters Patent is hereby corrected as shown below:

Column 2, lines 7-10, after "function," delete "and iterating the method ------------------------function of the next." and insert the same on Col. 2, Line 8, as a new sub paragraph.

Column 3, line 59, after "material" insert -- , --.

Column 5, line 10, after "function" delete "," and insert -- ; --, therefor.

Column 6, line 23, after "method" insert -- . --.

Column 6, line 29, after "introduced" insert -- . --.

Column 7, line 36, delete "a," and insert -- $\alpha_i$ --, therefor.

Column 8, line 44, delete "multichannel" and insert -- multi-channel --, therefor.

Column 8, line 55, delete "undiffacted" and insert -- un-diffracted --, therefor.

Column 9, line 34, delete "(PCI)" and insert -- (PCT) --, therefor.

Column 9, line 39, delete "Austrian" and insert -- Australian --, therefor.

Column 10, line 52, in Claim 6, delete "maimer" and insert -- manner --, therefor.

Column 10, line 54, in Claim 6, delete "charackristic" and insert -- characteristic --, therefor.

UNITED STATES PATENT AND TRADEMARK OFFICE
CERTIFICATE OF CORRECTION

PATENT NO.        : 7,200,301 B2
APPLICATION NO. : 10/523425
DATED             : April 3, 2007
INVENTOR(S)       : Buryak It is certified that error appears in the above-identified patent and that said Letters Patent is hereby corrected as shown below:

Column 11, line 2, in Claim 9, delete "$\kappa_s(i)$" and insert -- $\kappa_s(z)$ --, therefor.

Signed and Sealed this

Seventeenth Day of June, 2008

JON W. DUDAS
*Director of the United States Patent and Trademark Office*